(12) United States Patent
Dinesen et al.

(10) Patent No.: US 9,968,107 B2
(45) Date of Patent: May 15, 2018

(54) METHODS OF MAKING CHEESE PRODUCTS INCLUDING ARTIFICIAL EYES

(75) Inventors: Richard Dinesen, Woodbury, MN (US); Clint Garoutte, Elk River, MN (US); Kevin Schwartz, Two Rivers, WI (US)

(73) Assignee: LAND O'LAKES, INC., Arden Hills, MN (US)

( * ) Notice: Subject to any disclaimer, the term of this patent is extended or adjusted under 35 U.S.C. 154(b) by 740 days.

(21) Appl. No.: 13/562,753

(22) Filed: Jul. 31, 2012

(65) Prior Publication Data

US 2014/0037819 A1 Feb. 6, 2014

(51) Int. Cl.
| | | |
|---|---|---|
| *A23C 19/00* | (2006.01) | |
| *A23C 19/084* | (2006.01) | |
| *A23G 3/52* | (2006.01) | |
| *A23G 3/34* | (2006.01) | |
| *A23P 30/30* | (2016.01) | |

(52) U.S. Cl.
CPC .......... *A23C 19/084* (2013.01); *A23G 3/0012* (2013.01); *A23G 3/52* (2013.01); *A23P 30/30* (2016.08); *A23C 2250/10* (2013.01); *A23V 2002/00* (2013.01)

(58) Field of Classification Search
CPC ....... A23C 19/00; A23C 19/16; A23C 19/068; A23C 19/08; A23C 19/084; A23C 19/097; A23C 19/0973; A23C 2240/20; A23C 2250/10; A12V 2002/00; A12V 2250/00; A12V 2250/10; A12V 2250/11; A12V 2200/00; A12V 2200/20; A12V 2200/224; A12V 2200/226; A23G 3/52; A23G 3/0012; A23P 30/30; A23V 2002/00

USPC ....... 426/582, 474, 531, 580, 665, 392, 130, 426/491
See application file for complete search history.

(56) References Cited

U.S. PATENT DOCUMENTS

| 1,898,992 | A | * | 2/1933 | Guest | ............................. 426/474 |
| 2007/0154612 | A1 | * | 7/2007 | Trecker et al. | ............... 426/582 |

OTHER PUBLICATIONS

Snyder et al. "Validation of a Procedure Using CO2 for Rapid Cooling of Cheese Sauce". Food Production Trends. Jul. 2004.*
Dry Ice U of York 2013, downloaded from the internet at http://www.york.ac.uk/biology/intranet/health-safety/dry-ice/.*
Kapoor, R. et al., "Process Cheese: Scientific and Technological Aspects—A review." Comp. Rev. Food Sci. and Food Safety 7(2008) 194-214.*

* cited by examiner

*Primary Examiner* — Leslie A Wong
(74) *Attorney, Agent, or Firm* — Dorsey & Whitney LLP

(57) ABSTRACT

Food products including artificial eyes or eye voids interspersed throughout the product are provided by forming a visco-elastic mass of the food product and combining pieces of solidified carbon dioxide with the visco-elastic mass. The solidified carbon dioxide sublimes throughout the visco-elastic mass and forms carbon dioxide gas. The carbon dioxide gas expands and forms eye voids nearly instantaneously and the fully formed eye voids are provided in the food product in a matter of hours. In addition, gaseous carbon dioxide stored under pressure, such as through encapsulation or in a pressurized vessel, is combined with a visco-elastic mass and the released carbon dioxide gas expands and forms eye voids defined within the visco-elastic mass.

13 Claims, 2 Drawing Sheets

METHODS OF MAKING CHEESE PRODUCTS INCLUDING ARTIFICIAL EYES

FIELD OF THE INVENTION

The present disclosure relates to food products having artificial eyes formed therein and processes for forming artificial eyes in food products. More particularly, the present disclosure relates to providing cheeses and processes for providing cheeses having artificial eyes formed by the use of carbon dioxide ($CO_2$) in solidified and gaseous form.

BACKGROUND

Cheese varieties such as Swiss cheese typically contain voids or round holes in the cheese commonly referred to as eyes. The voids or eyes are the result of carbon dioxide produced by eye-forming starter bacteria (e.g., *Proprionibacterium fruedenreichii* subsp. *shermanii*). The manufacture of Swiss cheese with consistent eye formation is both science and art. There are many factors that affect the number, size, appearance and distribution of eyes. Bacteria viability and concentration, curd elasticity, imperfections in the cheese, lactate concentration, temperature, and duration in a warm room are just a few.

Cheese makers using eye-forming bacteria must wait several weeks or more for the eyes to form. The cheese can not contain a high level of salt because it would prevent growth and carbon dioxide production by the eye-forming bacteria. Further, the cheese can not be subjected to temperatures above about 130° F. because the bacteria responsible for producing carbon dioxide gas would be destroyed.

In addition, natural cheeses that are made without eye-forming bacteria typically do not form eyes. Further, the processing conditions typically associated with process cheese (e.g. heat treatments and emulsifier levels) typically prevent eyes from forming even in the presence of cultures.

SUMMARY

In view of the foregoing, provided herein are food products and processes that incorporate artificial eyes or eye voids that are interspersed throughout the food products. The voids may resemble natural eyes in cheese and are formed artificially using carbon dioxide in solid and gaseous form. This process allows manufacturers to produce voids in food products, such as pasta filata-type natural cheese and process type cheeses, in a matter of hours, and the food product may be heated to elevated temperatures while still allowing for the formation of voids resembling eyes in cheese, e.g., artificial eyes in cheese. The production methods of the present disclosure also allow food manufacturers, such as cheese manufacturers, to produce eye voids in the food product without bringing gas-forming cultures into a plant where they may cause flavor and texture defects in cheeses (e.g., Cheddar, Mozzarella and Provolone cheeses that typically do not include natural eyes).

In one implementation, a method of producing a food product having eye voids or holes includes working a food product to form a visco-elastic mass, and combining solidified carbon dioxide with the visco-elastic mass. As the solidified carbon dioxide sublimes into carbon dioxide gas, the carbon dioxide gas expands and causes eye voids to be defined or formed within the visco-elastic mass.

In another implementation, a method of producing a food product having eye voids includes working a food product to form a visco-elastic mass and forming eye voids defined by the visco-elastic mass using at least solidified carbon dioxide and/or stored gaseous carbon dioxide.

In yet another implementation, a method of providing cheese having eye voids includes providing a visco-elastic mass of cheese and combining solidified carbon dioxide with the visco-elastic mass of cheese. The solidified carbon dioxide sublimes into carbon dioxide gas and causes eye voids to be defined within and interspersed throughout the visco-elastic mass.

DETAILED DESCRIPTION

Figure 1:
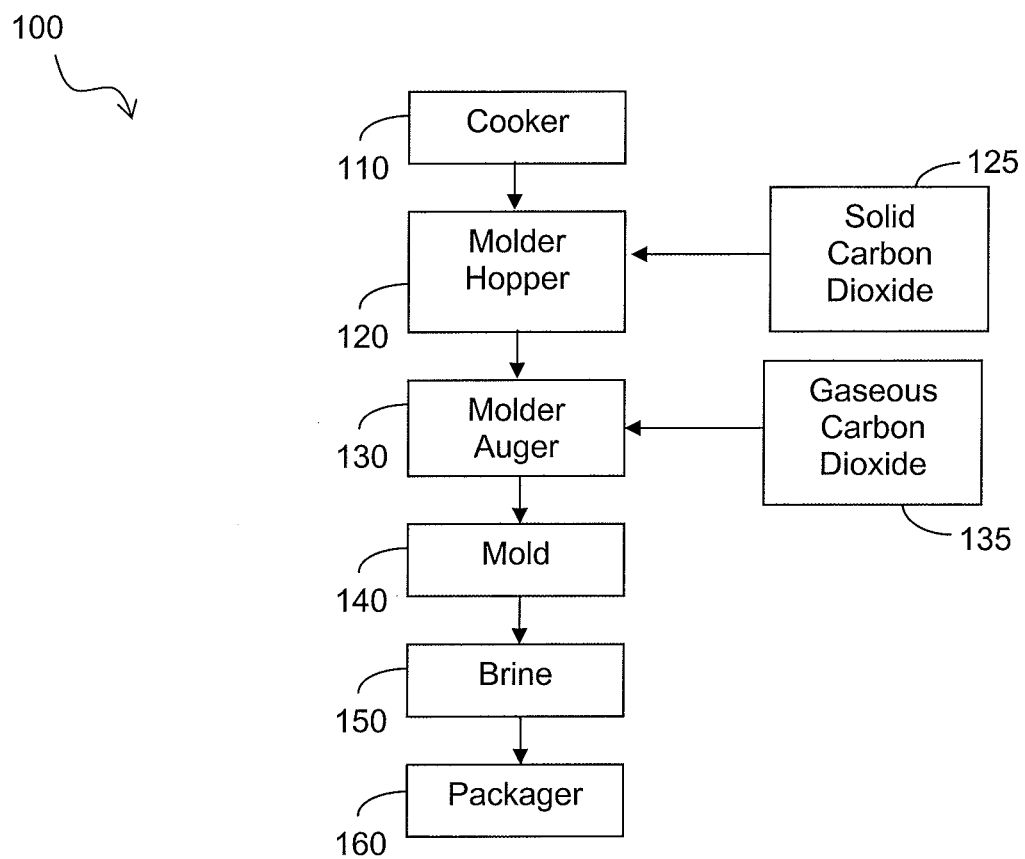
FIG. 1 illustrates a system for producing natural cheese with eyes formed therein according to certain implementations of the present disclosure.

Implementations provide food products and methods of making food products including artificial eyes or eye voids defined by the internal and external surfaces of the food products, which resemble eyes or holes in the food product. The eye voids may be formed by adding solidified carbon dioxide (e.g., dry ice), stored gaseous carbon dioxide, or combinations thereof, to the food product during production. For example, food products in a molten visco-elastic state may be combined with the solidified carbon dioxide, and sublimation of the solidified carbon dioxide into a gas causes the gaseous carbon dioxide to expand, thereby causing portions of the visco-elastic food product to expand and create eye voids.

The eye voids defined by the food products may take substantially any shape, but may generally include spherical, oval, elongated, or irregular shapes. The eye voids may be referred to as artificial eyes because the sublimation of carbon dioxide from a solid to a gas and pressurized carbon dioxide forms the eye voids, whereas natural eyes in cheese are formed by cultures producing carbon dioxide gas through fermentation. Upon formation of eye voids using solidified or gaseous carbon dioxide, some of the gas may escape from the food product, while a portion of the gas is absorbed into the food product.

The process for forming eye voids (e.g., artificial eyes) in food products may provide advantages over the traditional methods of forming natural eyes in cheese because a variety of food products adapted to form a visco-elastic mass may be combined with solidified or gaseous carbon dioxide to yield a product with fully formed eye voids within a matter of minutes or hours. For example, using solidified carbon dioxide, e.g., dry ice, the dry ice sublimes in a very short period of time after contact with the food product, and by nature of the carbon dioxide being cold, the structure of the food product may set and the eye void may be formed nearly immediately, e.g., within seconds or minutes such as between about 10 seconds and 5 minutes and any integer value therebetween. Full formation of the eye voids may require that the food product solidify and hold the form of the eye voids, which may take a number of hours, e.g., between about 1 to 24 hours, 3 to 7 hours, 1 to 7 hours, and any integer value between 1 to 24 hours. The rate of formation of eye voids may depend on factors such as temperature of the visco-elastic mass and the temperature at which the food product with the eyes formed therein is cooled. Using gaseous carbon dioxide, e.g., pressurized carbon dioxide within a gas cylinder or encapsulated within a precursor food product such as sugar, the gas nearly immediately expands upon contact with the food product and may form eye voids nearly immediately as discussed above. Full eye void formation may require that the food product solidify, as described above.

In contrast, natural eyes are typically only found in some natural cheeses and take weeks to form (e.g., blocks of natural Swiss cheese typically take from 2 to 7 weeks in a warm room for eyes to develop by gas-producing bacteria).

Implementations of the present disclosure may thus result in reduced inventory costs from the elimination of aging time and increased throughput. In addition, process cheese and cooked and stretched natural cheeses, like Mozzarella, typically are not capable of forming natural eyes in the cheese due to heat treatments (e.g., above 145° F.) and high salt levels that prevent subsequent bacterial growth and carbon dioxide production. However, due to the increased safety of pasteurized cheeses, and with the perceived enhanced flavor of cheese with eyes, artificially providing eye voids in pasteurized cheese may provide a safe and palatable cheese product. Additional advantages provided by products and processes of the various implementations will become apparent in view of the disclosure herein.

Food Products:

A variety of food products may be used in the process of creating artificial eye voids in food products according to the present disclosure. For example, mixtures of carbohydrates, protein, water and oil (e.g., fats) may be provided in a stable oil-in-water emulsion or water-in-oil emulsion and combined with carbon dioxide containing compositions to form eye voids therein. Without being limited to specific food products, natural cheese, process cheese, meats, formed gluten, dough (e.g., bread with and without yeast, cookie, pastry), batter (e.g., cake and other egg-containing batters), confectionery products (e.g., marshmallows) and other edible ingredients may be worked into a visco-elastic mass and may have eye voids formed within the food mass according to the present disclosure. The following examples of food products are provided as examples and should not be construed as limiting.

Natural Cheese Food Products:

Natural cheese curds may be used in connection with forming artificial eye voids in natural cheese food products. The natural cheese curds derived from milk may be produced using varying conditions (e.g., pasteurization conditions and using varying culturing and enzymes) and may contain varying fat and moisture levels. Accordingly, a variety of types of natural cheese curds may be used as a raw material in forming the natural cheese food products, and include but are not limited to: Gouda curds; Edam curds; pasta filata curds (e.g., plastic-curd cheeses such as Caciocavallo, mozzarella, Provolone, Pallone di Gravina, Scamorza and Silano); and Swiss curds. The resulting natural cheese product may be a natural cheese containing artificial eye voids having a similar composition to natural Gouda, Edam, pasta filata and Swiss cheese.

Process Cheese Products:

Process cheese products may also be used to form artificial eyes according to the present disclosure. Process cheese may form a visco-elastic mass of protein, water and oil in a stable oil-in-water emulsion and may be combined with carbon dioxide-containing sources to form eye voids, as discussed below. Process cheese, process cheese food and process cheese spread may each be provided as process cheese products and may differ from one another based on their fat and moisture content and pH, as addressed below.

Process Cheese:

Process cheese is produced by mixing and heating natural cheeses, such as the natural cheeses described above, with emulsifiers (e.g., emulsifying salts) to produce a homogeneous visco-elastic mass. This product is cooked typically at about 158-175° F. Generally, the process cheese is pasteurized and contains a fat content that is about the same and a moisture content not more than 1 percent greater maximum moisture content compared to the corresponding natural cheese.

Process cheese may have a composition that includes one or more of the following: natural cheeses or enzyme modified cheeses; emulsifying agents (at about 3 percent by weight); acidulants (e.g., vinegar, lactic acid, citric acid, acetic acid, phosphoric acid); milkfat (e.g., from cream, anhydrous milkfat or dehydrated cream at about 5 percent by weight); water; salt; colorants; flavorants (e.g., natural and artificial flavors and spices); preservatives (e.g., mold inhibitors such as sorbic acid, potassium sorbate and sodium sorbate or combinations thereof at about 0.3 percent by weight). The process cheese may have a moisture content of about 40 percent by weight, a fat content of about 30 percent by weight and a pH of about 5.3.

Process Cheese Food:

Process cheese food may include the same ingredients as the process cheese, and the product may be pasteurized. Compared to process cheese, process cheese food may contain a higher moisture content, less fat content, lower pH and cooking temperatures may be higher. Generally, the final product is softer in body than processed cheese. Cooking temperatures for this product may be around 82° C. and organic acids; such as citric; lactic; acetic; phosphoric; are added to decrease the pH level in the product. The final pH of processed cheese should range from about 5.2 to about 5.6.

As provided above, the process cheese food may have a composition that includes the same ingredients as process cheese. Natural cheeses and enzyme modified cheeses may be provided in an amount of at least 51 percent by weight of the final products and may also contain milk; skim milk; buttermilk and cheese whey. The process cheese food may have a moisture content of less than about 44 percent by weight, a fat content of greater than 23 percent, and a pH of at least about 5 percent.

Process Cheese Spread:

Process cheese spread may be manufactured similar to the processed cheese and processed cheese food along with the incorporation of excess moisture to provide for better spreadability of the product. This product may be cooked to about 88° C. and organic acids may be added to acidify the product during processing.

The same optional ingredients as processed cheese food may be included in process cheese spread. In addition, sweetening agents, starches, and gums/hydrocolloids at about 0.8 percent of the finished product may be used. The gums/hydrocolloids may provide for additional water binding for this higher moisture product.

For example, the process cheese spread may include cheeses such as natural cheeses and enzyme modified cheeses at least at about 51 by weight of the final products, one or more of the above-listed ingredients in the processed cheese food, food gums and flavorants such as sweeteners. The process cheese spread may have a moisture content of about 44 to about 60 percent by weight, a fat content of at least about 20 percent, and a pH of at least about 4.0.

A variety of other products and low-fat versions of the above products may also be used in connection with forming artificial eye voids in the finished product. For example, pasteurized process cheese products may include varying levels of fat and moisture. Additional ingredients that may be included in the food products include fruits, vegetables, herbs, sugars, spices, flavors and colors.

Carbon Dioxide Compositions for Forming Artificial Eyes:

Artificial eye voids in food products may be formed using a variety of carbon dioxide-containing ingredients.

Solidified Carbon Dioxide:

As described above, solidified carbon dioxide, also known as dry ice, may be used to form the eye voids or artificial eyes. The solidified carbon dioxide is typically maintained at a temperature below −109.3° F. to prevent sublimation until its combination with the food product. The solidified carbon dioxide may be provided in a granular form, such as 100 μm to 1 mm granules, 1 mm to 5 mm granules, or any integer or integer combination thereof, in pellet form, such as 1 mm in width and between 1 mm and 5 mm in length, or any integer or integer combination thereof, in shaving form and combinations thereof.

In one example, the solidified carbon dioxide is ground into pieces of varying sizes, which may be used to produce the voids spaces of varying sizes similar to those found in some food products such as Swiss cheese. In some implementations, the solidified carbon dioxide may account for about 0.5 percent up to about 10 percent, or less than 1.0 percent by weight of the total weight of the food product composition. Providing too much solid carbon dioxide may result in over-expansion of the food product and may cause the carbon dioxide to burst or bubble out of the plastic mass without forming the eye voids.

The solidified carbon dioxide may be combined with other ingredients such as flavorants (e.g., food powders, cheese powders and spice mixtures), colorants or texturizing compositions prior to use in forming the artificial eyes in the food products. For example, the additional ingredients may be used to coat (e.g., by sprinkle coating or spray coating) an outer surface of the solidified carbon dioxide or may be incorporated therein. This may result in surfaces or regions defining the eye voids in the food products including the flavor, color and/or the texture provided by the solidified carbon dioxide, which thus serves as a food ingredient carrier.

Carbon Dioxide Gas-Containing Ingredients:

Other compositions that may provide artificial eyes in the food products include ingredients containing carbon dioxide gas. For example, water containing carbon dioxide bubbles, such as carbonated water may be used to form artificial eyes in food products. For example, the carbonated water may be flavored, such as Swiss cheese flavored water, and the carbonated water may be combined with a food product to provide the artificial eyes and a Swiss cheese flavor.

Carbon dioxide gas may also be stored under pressure and may be used to form artificial eyes in food products. For example, the carbon dioxide gas may be directed into the food products by using nozzles or needles and injecting the carbon dioxide gas into the food product at a gas pressure, which may be elevated or slightly elevated compared to the pressure at which the food product is processed.

Carbon dioxide gas may be encapsulated under pressure within an edible composition and may be combined with the food product to form artificial eyes. For example, sugar, water and flavoring may be mixed with pressurized carbon dioxide gas and the solidified mixture holds the encapsulated, pressurized carbon dioxide within granules until the granules dissolve in the food products and cause portions of the food product to expand.

Methods of Forming Artificial Eyes in Food Products:

Food products adapted to undergo processing conditions that provide a visco-elastic mass (e.g., a molten (e.g. heated), plastic, pumpable and/or pliable mass) are combined with small pieces of solidified carbon dioxide to rapidly cause the formation of the artificial eyes, as described further below.

Methods of Forming Artificial Eyes Using Natural Cheese:

Artificial eyes in natural cheese may be formed using the system 100 depicted in FIG. 1. According to the system 100 of FIG. 1, natural cheese curds may be added to a cooker 110 where the curd is cooked and stretched using steam or hot water, to a temperature of about 125° F. to about 145° F. The cooked cheese may be a molten visco-elastic cheese mass. Alternatively, a visco-elastic cheese mass may be obtained from other known methods. In some implementations, the visco-elastic mass may be homogenized or substantially homogenous, while in alternative implementations, the mass is a non-homogenous mixture.

In the visco-elastic state, the cheese mass may be provided to a molder hopper 120 where, in some implementations, solid carbon dioxide 125 (e.g., small pieces in granular, shaved or pellet form) is combined with the cheese mass. The molder hopper 120 may be adapted to receive cheese from the cooker 110 and feed the cheese mass alone or in combination with the solid carbon dioxide 125 to a molder auger 130.

The molder auger 130 may be adapted to push the cheese mass or its mixture with the solid carbon dioxide 125 into a mold 140. Upon delivery to the mold 140, the cheese mass with the eye voids forming or formed therein is forced under pressure into the mold 140 that gives the cheese product its shape.

In system 100, when the solidified carbon dioxide 125 is added to the visco-elastic mass in the molder hopper 120, the carbon dioxide may sublime within the cheese as the mixture travels in the molder auger 130 towards the mold 140, and eye voids may begin to form in the cheese mass. In addition or alternatively, solid carbon dioxide 125, stored gaseous carbon dioxide 135 or both, may be added to the cheese or the mixture in the molder auger 130 and form the eye voids in the cheese mass.

Using the solid carbon dioxide 125, the eye voids formed are typically several times larger than the size of the pieces of solid carbon dioxide 125 mixed in the cheese mass. Thus, a small amount of solid carbon dioxide 125 (e.g. about 0.5 to about 2.0 weight percent of the weight of the visco-elastic mass) may produce enough carbon dioxide gas to form eye voids throughout the cheese. The degree of expansion of the carbon dioxide gas may vary depending on the amount of solid carbon dioxide added to the cheese and the temperature and elasticity of the cheese. The eye voids may be formed nearly instantaneously upon sublimation, and as the molten cheese cools from sublimation, the cheese may set around the eye voids thereby retaining their shape. Using the stored gaseous carbon dioxide 135, the size of the eye voids may vary depending on the pressure difference between the gas and the cheese mass as well as the temperature and elasticity of the cheese. Where the temperature of the gaseous carbon dioxide is lower than the temperature of the cheese mass, the cheese may cool in areas where eye voids are formed and may begin to set. The resulting product may include eye voids interspersed throughout an interior and exterior of the product. As the cheese product sets, the shape of the eye voids may be retained.

In some implementations, prior to delivery to the molder hopper 120 or the molder auger 130, the molten cheese mass may be partially cooled so that the visco-elastic cheese mass partially sets prior to its incorporation with the solid carbon dioxide 125 in order to control the expansion of the cheese mass during formation of the eye voids. In this state, the visco-elastic cheese mass may form a stable emulsion of ingredients (e.g., protein and oil). The mass may have a temperature of less than 140° F., at least 100° F., from about 100° F. to about 145° F., from about 110° F. to about 140° F., from about 130° F. to about 140° F., less than about 165° F., or any combination thereof.

In addition or alternatively, the rate at which the solid carbon dioxide 125 is added to the visco-elastic mass and its distribution may be controlled to prevent carbon dioxide gas from escaping from the cheese prematurely, e.g., escaping prior to the eye voids being formed in the cheese and to prevent clumping of the solidified carbon dioxide in one area of the product.

Upon its addition to the cheese mass, the solid carbon dioxide 125 may account for less than 10 percent by weight of the total weight of the mass. Because the solid carbon dioxide 125 converts into its gaseous state, the final cheese product may have a final weight that is about the weight of the molten mass prior to the addition of the solid carbon dioxide plus the weight of any additional ingredients added to the cheese product.

The molded cheese product with the eye voids defined therein may be cooled and salted in a salt brine 150. Brining in the brine 150 adds salt to the cheese product. The cheese product may be packaged using one or more packaging devices 160, and further cooled in a cooler prior to shipping.

The packaged cheese product with eye voids may be a 6 lb loaf of natural cheese (e.g., pasta filata-style cheese), or may be provided in other shapes as desired. In another example, the cheese product with eye voids may be sliced or may be produced as a slice on slice product with a number of individual cheese slices defining openings.

In system 100, the eye voids formed within the cheese may be substantially formed from the sublimation of solid carbon dioxide into its expanded, gaseous state or from the stored gaseous carbon dioxide. In some implementations, the composition of the cheese mass may be free or substantially free of carbon dioxide-producing bacteria so that even if the cheese product was stored at temperature ranges that promote natural eye formation from eye-forming bacteria, natural eyes would not form. In other implementations, the cheese might contain a high level of salt which would not be possible when using eye-forming bacteria because the high salt level would prevent growth and carbon dioxide production of the eye-forming bacteria. In addition, or alternatively, the cheese product may be stored at temperatures of below 45° F., which prevents natural eyes from forming in the cheese product. For example, over the course of about 3 to 5 days from production of the cheese product, the cheese product may be gradually cooled to about 45° F. and stored prior to shipping.

In further implementations of process 100, the solid carbon dioxide may be pre-treated prior to its addition to the molten mass of cheese. For example, as described above, the solid carbon dioxide may be coated with one or more ingredients to be incorporated into the cheese. Upon the sublimation of the carbon dioxide, portions of the food product defining the eye voids may include a residue formed of the coated ingredients.

While process 100 has been described in connection with natural cheese, it will be appreciated that other food products adapted to form a visco-elastic mass may undergo similar processing conditions and may perform substantially similarly as in the above disclosure.

Figure 2:
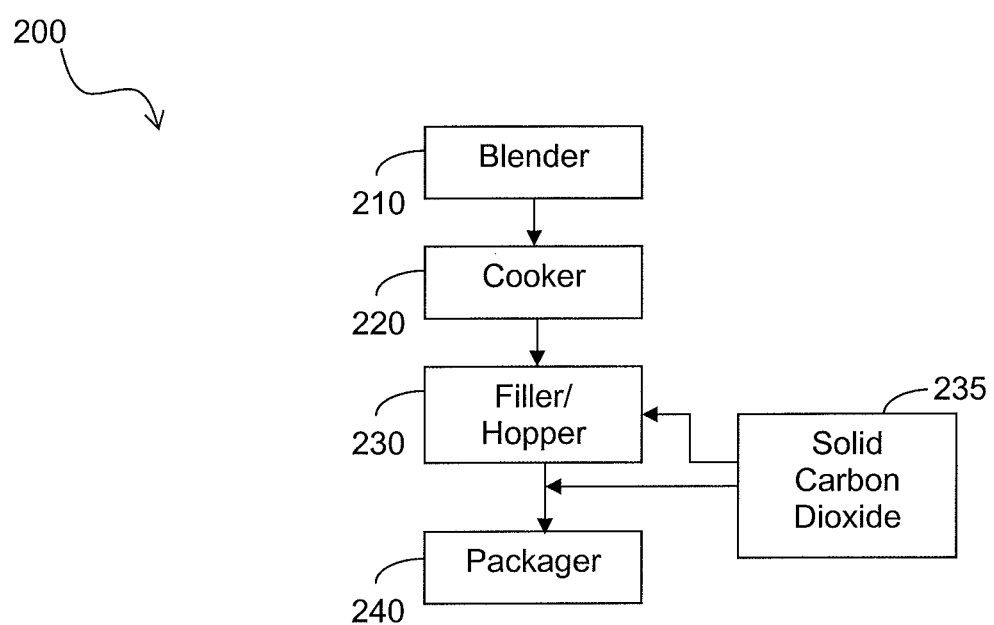
FIG. 2 illustrates a system for producing process cheese with eyes formed therein according to implementations of the present disclosure.

Methods of Forming Artificial Eyes Using Process Cheese:

For process cheese products, eye voids similarly may be formed after preparation of a molten visco-elastic mass. FIG. 2 illustrates a system 200 that may be used to provide a process cheese product having eye voids formed therein.

In system 200, the process cheese ingredients such as ground cheese, emulsifiers, salt and minor ingredients may be added to one or more blenders 210 where the ingredients are mixed. The mixed ingredients may be transferred to a cooker 220 (e.g., batch or continuous) adapted to pasteurize the mixture (e.g., heat the mixed ingredients up to at least about 150° F. for at least about 30 seconds). The pasteurized mixture may result in a molten visco-elastic mass of protein, water and oil in a stable oil-in-water emulsion. The visco-elastic mass of process cheese may be transferred to a filler/hopper 230 adapted to receive and deposit the visco-elastic mass into a pouch (e.g., a film pouch). Pieces of solid carbon 235 dioxide may be mixed with the molten visco-elastic mass in the filler/hopper 230 or may be deposited in the pouch after receipt of the visco-elastic mass. Alternatively, the solid carbon dioxide 235 may be added to the molten mass during mixing, prior to extrusion into a cheese mold, or may be added to the molten mass prior to placing the cheese in the primary package. Voids spaces of different sizes are defined within the visco-elastic mass, and the cheese may set during cooling and define the eye voids. The cooling process may be by natural cooling, where the process cheese is allowed to cool within an ambient temperature environment or may be cooled in a refrigerated environment.

In some implementations, the temperature of the visco-elastic mass, upon receipt of the solidified carbon dioxide, may be about 165° F. In alternative implementations, the temperature of the visco-elastic mass may be cooled to a lower temperature such as about 140° F. to about 100° F., at about 115° F. or down to about 100 for process cheese prior to receiving the solidified carbon dioxide.

In further implementations, a slice on slice system may incorporate eye void forming technologies. For example, as a molten mass of cheese flows through an opening on a distribution manifold where the thickness of the cheese product is controlled, solidified carbon dioxide may be added to the cheese as it flows through the opening or upon reaching a desired thickness. As the cheese travels on a belt conveyor, the solidified carbon dioxide may sublime and form the eye voids.

The process cheese with the artificial eyes formed therein may be packaged using one or more packaging devices 240. For example, the packaged process cheese product may be packaged in a 5 lb. loaf, may be provided as a sliced product or a slice on slice product, or may be packaged in any desirable shape.

Aspects of system 100 may be applicable to process cheese described in connection with system 200. For example, solid carbon dioxide may be provided in the process cheese in the same amounts and may exhibit the same characteristics as those described above in connection with forming artificial eyes in natural cheese. In addition, providing artificial eyes in process cheese using the systems and methods of the present disclosure provide advantages because other methods of forming eyes in cheese are generally not available to pasteurized process cheese. Further, process cheeses may provide advantages due to their ability to be tailored for flavor and texture beyond natural cheeses.

Methods of Forming Artificial Eyes in Other Food Products:

Other food products adapted to be formed into a visco-elastic mass may also be used in the systems and methods of forming eye voids in cheese. The visco-elastic mass may be formed through a variety of processes including blending, heating, stretching, extruding and a visco-elastic or plastic mass formed therefrom may be combined with solid carbon dioxide in the manner described above in connection with forming eye voids in natural and process cheeses. In some implementations, the visco-elastic mass may be stabilized to enable the mass to set upon formation of the eye voids therein, as discussed above.

Methods of Forming Artificial Eyes in Food Products Using Carbon Dioxide Gas:

In some implementations, the visco-elastic mass may be combined with gaseous carbon dioxide to form eye voids. For example, as provided above, carbonated water, compressed carbon dioxide gas, encapsulated carbon dioxide gas and solidified carbon dioxide, may be used alone or in combination to form eye voids.

By using encapsulated carbon dioxide gas, the encapsulant holding the carbon dioxide gas may be formed of a variety of ingredients that may provide flavors, colors or textures to the food product. As the encapsulant dissolves within the food product to cause the release of the encapsulated carbon dioxide gas, the carbon dioxide gas causes the food product to expand and form eye voids therein. In some implementations, the encapsulant may result in the formation of a gel-like substance within the void.

In yet further implementations, the visco-elastic mass may be injected with carbon dioxide gas stored under pressure to form eye voids.

In further implementations, carbon dioxide in solid or gaseous form may be used to increase throughput of food products. As discussed above, the methods of using carbon dioxide in cheese products enables eye voids to be formed in cheese within a few hours as opposed to weeks. In addition, by adding carbon dioxide to plastic dough, such as bread dough, throughput may be increased due to the manual, substantially instantaneous introduction of carbon dioxide as opposed to its gradual introduction through the fermentation of yeast.

In some implementation, upon forming eye voids within the food products, the eye voids may receive additional ingredients through vacuum infusing. For example, liquid or a pumpable food product may be vacuum infused into the eye voids to provide a food product with a variety of flavors and textures.

The compositions, apparatuses and functions of the various implementations may be used interchangeably to form alternative implementations, as would be appreciated by those skilled in the art. Although the present disclosure provides references to preferred embodiments, persons skilled in the art will recognize that changes may be made in form and detail without departing from the spirit and scope of the invention.

What is claimed is:

1. A method of producing a cheese product having eye voids, comprising:
    working and heating a cheese product to form a molten visco-elastic mass, the mass having a temperature of less than 140° F.;
    coating solidified carbon dioxide with a food ingredient by sprinkle coating or spray coating;
    combining the coated, solidified carbon dioxide with the visco-elastic mass such that the solidified carbon dioxide sublimes into carbon dioxide gas and causes eye voids to be defined within the visco-elastic mass; and
    packaging the visco-elastic mass including the eye voids defined therein,
    wherein the mass is allowed to set and the eye voids are maintained in the set mass.

2. The method of claim 1, wherein the eye voids fully form within the visco-elastic mass within 24 hours.

3. The method of claim 1, wherein the solidified carbon dioxide comprises up to 10 percent by weight of the total weight of the combined solidified carbon dioxide and visco-elastic mass.

4. The method of claim 1, wherein the visco-elastic mass comprises a natural cheese.

5. The method of claim 1, wherein the visco-elastic mass is a process cheese.

6. A method of producing a cheese product having eye voids, comprising:
    working and heating a cheese product to form a visco-elastic mass;
    forming eye voids defined by the heated visco-elastic mass using pressurized gaseous carbon dioxide released from edible, solid granules that hold the pressurized gas, said granules coated with a food ingredient by sprinkle coating or spray coating; and
    allowing the mass to set, wherein the eye voids are maintained in the set mass.

7. The method of claim 6, wherein the visco-elastic mass comprises a natural cheese.

8. The method of claim 7, wherein the natural cheese is free of eye-forming bacteria or is stored at a temperature in which natural eyes are prevented from forming in the cheese product.

9. The method of claim 7, wherein the visco-elastic mass is a process cheese.

10. The method of claim 6, wherein the edible granules comprise at least one of sugar, water, or flavoring.

11. The method of claim 6, wherein the carbon dioxide is combined with the visco-elastic mass during packaging.

12. The method of claim 1, wherein the food ingredient is a flavorant, colorant, or texturant and the areas adjacent the eye voids include the flavor, color, or texture, respectively.

13. The method of claim 12, wherein the food ingredient is a flavorant selected from a food powder, cheese powder, and spice mixture.

* * * * *